United States Patent [19]

Krieger

[11] 4,210,9

[45] Jul. 8, 19

---

[54] GEAR PULLER

[75] Inventor: Raymond L. Krieger, Denver, Colo.

[73] Assignee: B. K. Sweeney Manufacturing Company, Denver, Colo.

[21] Appl. No.: 969,448

[22] Filed: Dec. 14, 1978

[51] Int. Cl.[3] .................................... B23P 19/04

[52] U.S. Cl. .................................... 29/263

[58] Field of Search .................... 29/263, 264, 269

[56] References Cited

U.S. PATENT DOCUMENTS

| | | | |
|---|---|---|---|
| 1,417,265 | 5/1922 | McClarran | 29/263 |
| 1,435,278 | 11/1922 | Campbell | 29/263 |
| 1,525,274 | 2/1925 | Day | 29/263 |
| 1,599,332 | 9/1926 | Kerr | 29/263 |
| 2,496,005 | 1/1950 | Grant | 29/263 |
| 3,358,352 | 12/1967 | Wilcox | 29/263 |

FOREIGN PATENT DOCUMENTS 800966 12/1950 Fed. Rep. of Germany ............ 29/

*Primary Examiner*—James L. Jones, Jr.
*Attorney, Agent, or Firm*—Gary M. Polumbus

[57] ABSTRACT

The apparatus of the invention comprises a gear pul assembly with removable jaws adapted to be extenc around the teeth of the gear to be pulled from a sh and screw means capable of exerting pressure requi to pull the gear.

The method of the invention includes the steps of p tioning a first puller jaw affixed to the gear puller sembly around a portion of a gear press-fitted ont shaft, positioning a second puller jaw around a rema ing portion of the gear and affixing the second pul jaw to the gear puller assembly, then applying the fo necessary to pull the gear.

4 Claims, 6 Drawing Figures

GEAR PULLER

BACKGROUND OF THE INVENTION

This invention relates to pulling gears from a shaft wherein such gears have been pressed onto the shaft and key locked into position. More particularly the invention discloses a device for pulling gears and method of operating the device.

Applying mechanical advantage to pull various items from their fixed positions is well known in the art. In one prior art device a gear puller containing a single puller jaw can be positioned behind the gear to be pulled. Such device is limited to a jaw contact approximating one half the periphery of the gear and performs reasonably well when the gear is reasonably easy to pull. In stubborn cases, however, the single jaw has a tendency to move off the gear thereby rendering the tool less effective. The present invention has been designed to overcome the above problem so as to provide a positive grip on the gear to be pulled.

SUMMARY OF THE INVENTION

The improvement disclosed in the present invention involves the use of a pair of puller jaws, which when fitted together form a cylindrical sleeve that is used to encompass the teeth of the gear to be pulled. In describing the various parts of the present device, for clarity the trailing end of a part is the end closest to the position of the operator when the device is in use, and the leading end of the part is the end furthest from the position of the operator. A part that is described as permanently affixed is not intended for disassembly. A part described as semi-permanently affixed is intended to remain affixed during repeated uses of the device, while a part described as temporarily affixed is intended to be disassembled after each use of the device.

The jaw may be fabricated in any convenient manner but preferably are formed from a heavy wall tube. In the inside diameter of the tube a groove is established, such groove being positioned near the leading end of the tube. This groove leaves a lip at the leading end of the tube which provides a bearing surface used to apply force on the gear. The width and depth of the groove is established to provide ample room to accommodate the teeth of the gear to be pulled. The jaws themselves are formed by cutting the tube into two half-sleeves.

In the use of the device the operator semi-permanently affixes the trailing end of a first puller jaw to the teeth of the gear to be pulled. The operator then attaches the trailing end of the second jaw to the gear puller asembly, the leading end of the second jaw being placed around and behind the remainder of the teeth of the gear. The second jaw is attached to the gear puller assembly by means of dowel pins, such pins when placed in position cause the pair of jaws to be snug fitted against each other thereby forming a cylindrical sleeve. The operator then advances a puller bolt against the shaft, so as to apply the force necessary to dislodge the gear.

BRIEF DESCRIPTION OF THE PREFERREI EMBODIMENT

By way of example the gear puller of the prese invention is described with regard to use on Cummi diesel engines, although it is recognized that either identical form or with minor changes the puller cou be used to pull press-fitted gears from shafts of oth makes and types.

Figure 1:
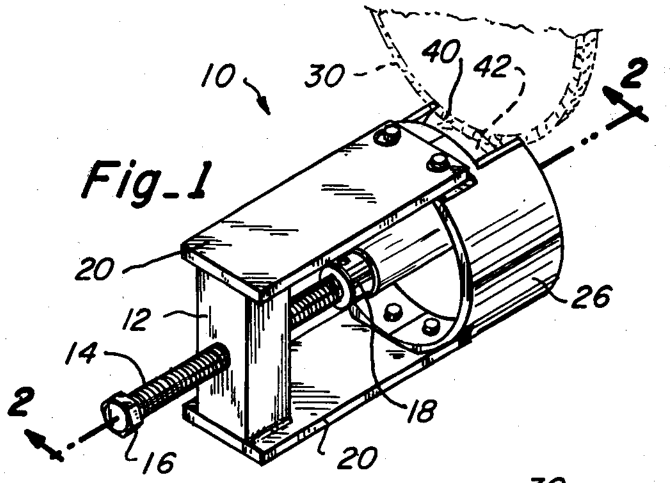
FIG. 1 is an isometric view of the gear puller shown with jaws engaged around a gear which is shown in phantom lines.
Figure 2:
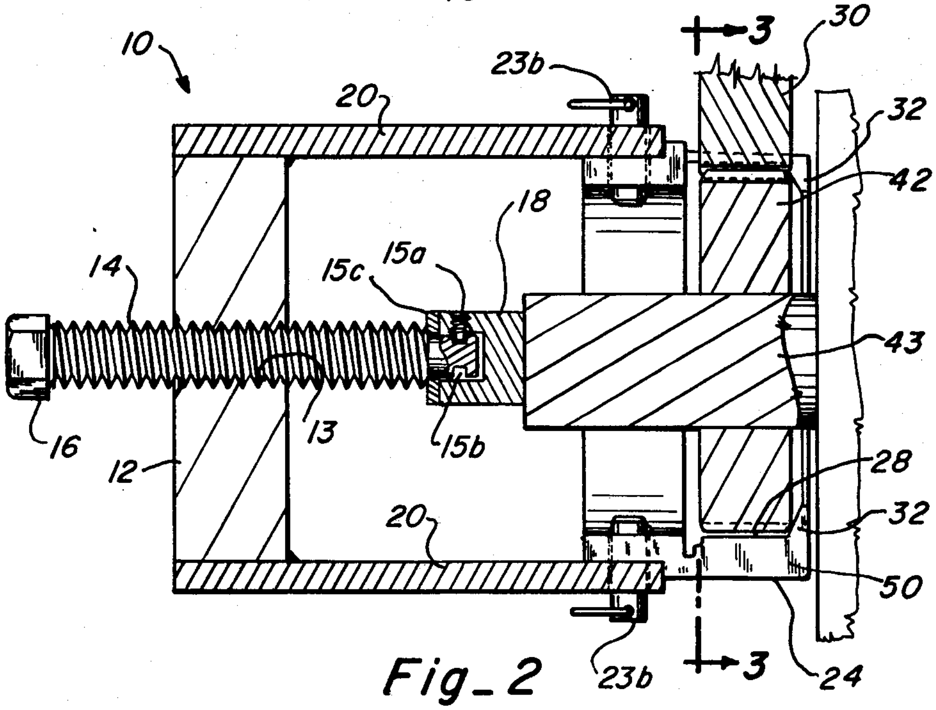
FIG. 2 is a section taken along line 2—2 of FIG. 1.
Figure 3:
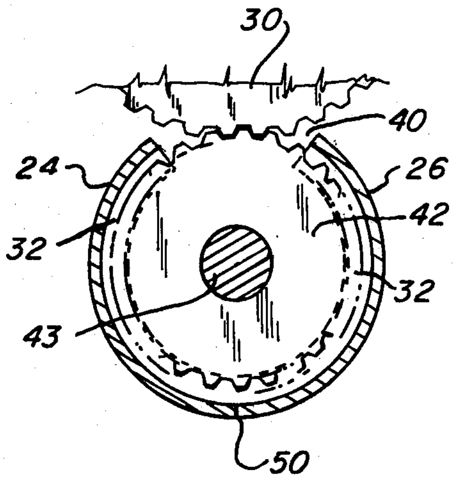
FIG. 3 is a section taken along line 3—3 of FIG. 2.

The gear puller assembly 10 of the present inventi (see FIG. 1) has a base block 12, sometimes called t rigid structural means, which could be a steel bar appropriate dimensions, for example 1.5 inches wide 1.5 inches deep by 5.2 inches long. A hole 13 is provid at the midpoint of the length of the bar and is tapp with threads matching those of a puller bolt 14. Pul bolt 14 in the illustrated embodiment is 0.9 inch in dia eter and 6.3 inches long. The puller bolt preferably l a standard hexagonal head 16 (FIG. 2) at its trailing er The puller bolt is screwed into position, for examp approximately half its length through the threaded h 13 in base block 12 (FIG. 1). Affixed to the leading e of puller bolt 14 is a swivel pad 18 which may be tached in any convenient manner, but preferably witl set screw 15*a* that rides in a groove 15*b* machined ir the puller bolt so that the swivel pad can rotate fre relative to the puller bolt. For ease of operation a thr pad 15*c* can be installed between the leading end of t puller bolt 14 and a seat 15*d* in the swivel pad.

Affixed to each end of the base block 12 in a perp dicular forward extension relationship to the base blc is a puller leg or rigid extension leg 20 which in ea case could be a steel bar of appropriate dimensions, example, 0.4 inch thick, 2.5 inches wide and 6.6 incl long. Each leg is permanently affixed to the base blc 12, for example by welding, and each leg is position flush and centered on each end of the base block Legs 20 are aligned parallel with the puller bolt 14. the leading end of each leg, two holes 22 of suital diameter, for example 0.5 inches, are positioned a su able distance from the tip of each leg, for example t center of each hole being 0.5 inch from the top edge a 0.5 inch from the side edge. The holes 22 are used accommodate pins 23*a* and 23*b* that are used to atta puller jaws 24 and 26 to the gear puller assembly 10 a manner to be described later. Gear puller assembly is composed of a base block 12, and the puller bolt equipped with swivel pad 18 and legs 20.

Figure 4:
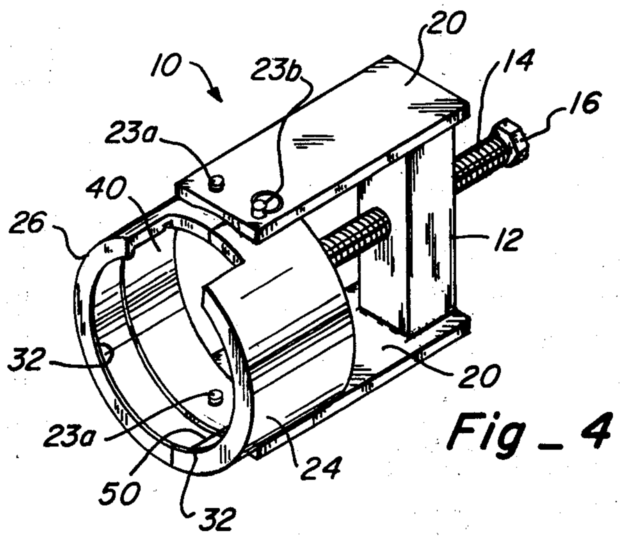
FIG. 4 is an isometric view of the gear puller fron different angle than that of FIG. 1.
Figure 5:
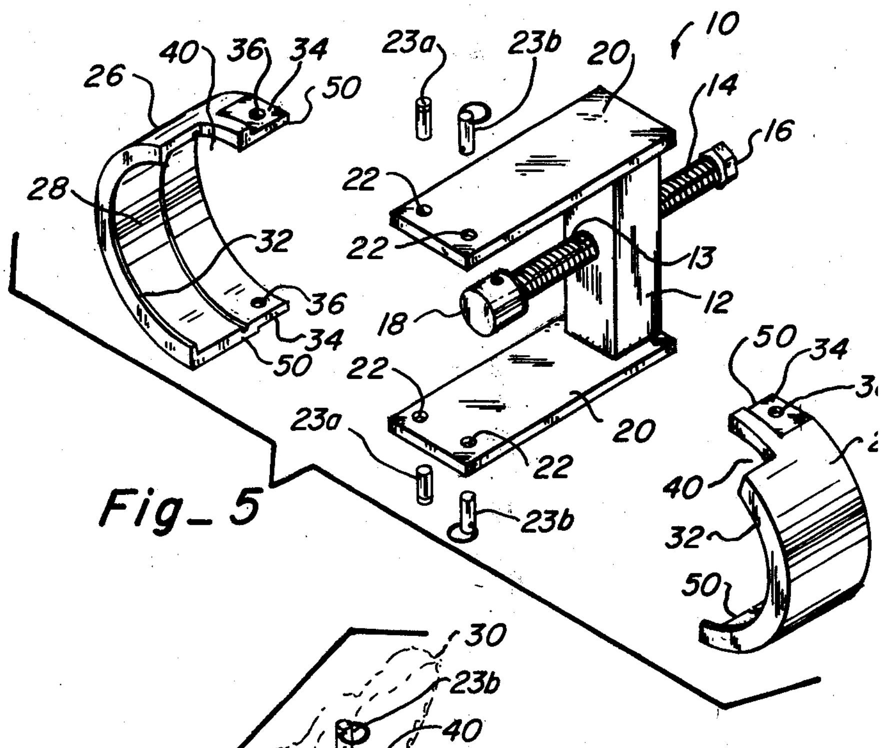
FIG. 5 is an exploded isometric view showing t puller assembly.
Figure 6:
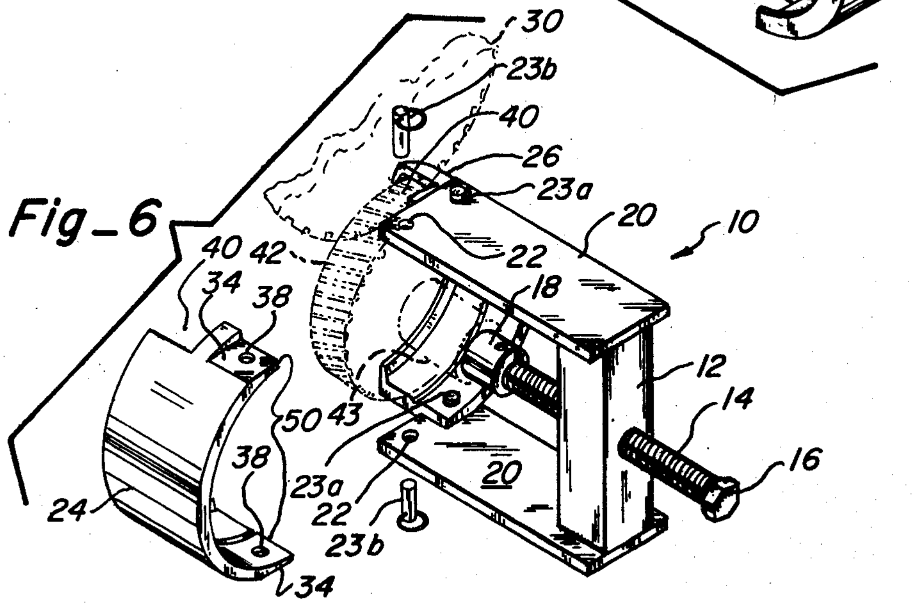
FIG. 6 is an exploded isometric view of the pul assembly from a different angle than that shown in FI 5.

Pins 23*a* and 23*b* used to attach puller jaws 24 and preferably are of two types: a flat head pin 23*a* that c be used for semi-permanent attachment of one pul jaw 26, and a removable dowel pin 23*b* which can used to attach the second and mating puller jaw 24 ea time a pulling job is done. As a matter of convenien each dowel pin 23*b* can be tethered to a leg 20 by a sh length of chain (not shown), for example, four inches length, to keep the dowel pin handy for repeated us The puller jaws 24 and 25 preferably are fabrica from heavy wall steel tubing, for example 3 inches length with an outside diameter of 5.8 inches and inside diameter of 4.4 inches. Preferably the jaws ɜd by machining the single length of tubing. An ıal cylindrical groove 28 is machined adjacent to ɜading end of the tubing, such groove beginning at nt approximately 0.1 inch from the end of the tub- :he groove width being approximately 1.5 inches he groove depth being approximately 0.3 inches. machine cut defines a lip 32 at the leading end of ıbing. The inner face of lip 32 preferably is beveled from the root to the innermost edge.

ıt surfaces 34 are cut at opposite sides into the outer drical surface of the tubing at the trailing end, such urfaces being approximately 2 inches long and 1 wide. Two holes 36 and 38 are then drilled through flat surface 34 on the tubing, such holes being 1.5 ;s apart at their centers, such centers being posi- d approximately 0.5 inch from the trailing end of ıbing. The holes 36 and 38 are positioned to mate holes 22 in legs 20.

ıotch or window 40 is then cut into the leading end ıe tubing, such window being approximately 3 ;s long and 1.5 inches wide. The window is posi- d so that it is longitudinally aligned with one of the ,urfaces 34. Window 40 provides an opening to a gear 30 emeshed in gear 42. The final step in ɜating the puller jaws is to cut the tubing into two ;leeves, such cut being made along the longitudinal nidway between holes 36 and 38. One half-sleeve becomes puller jaw 24 and the other becomes r jaw 26.

ıth the component parts as heretofore described, a ɔf the device can proceed to pull gear 42 from shaft ˜he operator first backs off on puller bolt 14 to ide clearance between shaft 43 and puller assembly ʹuller jaw 26 is then semi-permanently affixed to puller assembly 10 by inserting flat head pins 23*a* ıgh holes 22 in both legs 20 and through holes 36 in 26, fixing the pins 23*a* in place with cotter pins. r jaw 26 next is positioned on gear 42 so that the teeth are inserted into groove 28, with the resultant ioning of lip 32 behind gear 42. Puller jaw 24 then sitioned on gear 42 in a like manner with jaws 26 24 being in a juxtaposition relationship abutting ıst each other. Jaw 24 is then temporarily affixed to r assembly 10 by inserting dowel pins 23*b* through ; 22 in legs 20 and holes 38 in jaw 24. Upon the ıg of dowel pins 23*b*, jaws 26 and 24 are forced :her in a snug fit in the gear pulling position as rated in FIGS. 1 and 4. Because of the lateral dis- ;ment of the dowel pins 23*a*, 23*b* from a plane pass- hrough the centerline of the puller bolt 14 and the 20, and further because of the fact that the pin ving holes in the respective jaws 26 and 24 are ɜent the upper extremity of the semi-cylindrical of each of the jaws, the jaws thus are inherently ıed to move toward each other and such inclina- continues as pulling force is applied.

ıe tool as thus assembled and positioned is now engaged and locked into the proper position. In nal step of the gear pulling procedure, the operator nces puller bolt 14, preferably with an impact ;ch, until the gear is dislodged from the shaft. As be appreciated, the puller jaws will retain aligned ions relative to gear 42 and will not be forced out ignment as was the case with the prior art pullers. e present invention jaws 24 and 26 are snugly abutted along side edges 50 and are restrained from movement by pins 23*a* and 23*b*. The prior art pullers had a maximum effective bearing surface on the gear to be pulled representing about 180° of an arc, whereas the maximum effective bearing surface of the present invention in the form of lips 32 describes an arc up to a practical limit approximating 310° and could be 360° if there were not a problem of clearing an emeshed gear.

For a repeated use of the tool, the dowel pins 23*b* are removed and the jaw 24 is disengaged from puller assembly 10. Jaw 26 is then positioned with lip 32 behind the second gear to be pulled, and the jaw 24 is positioned and pinned to puller assembly 10 with the gear being pulled as previously described.

While the present invention has been described with a certain degree of particularity, such description has been made by way of example and it is recognized that details of structure may be made without departing from the spirit thereof.

I claim as my invention:

1. Apparatus for pulling a press-fitted gear from a shaft comprising in combination:

puller assembly means including a rigid structural member and a screw thrust member threadedly received in the structural member for reciprocal movement relative to the structural member, first and second puller jaws means, each having a semi-cylindrical wall, such that the jaw means can be placed in side-by-side relationship to form a generally cylindrical wall, each of said puller jaw means having a radially inturned lip extending along a portion of its periphery at one end of said semi-cylindrical wall, each of said puller jaws means also having a notch in the semi-cylindrical wall at said one end, leg means each connected to said structural member and pivotally connected to each of said puller jaws means at a point laterally displaced from a plane passing through the centerline of said screw thrust member and said leg means, said pivot connection being adjacent the upper extremity of said semi-cylindrical wall, at least one said connections to said puller jaw means being adjacent to and in axial alignment with said notches in said puller jaws means so that when said lips on said puller jaw means are positioned behind said gear and the thrust member is advanced against said shaft, the leg means will pull on the puller jaw means and pivotally bias the lip on the first puller jaw means toward the lip on the second puller jaw means to assist in maintaining the lips behind the gear.

2. The apparatus of claim 1 further including means for releasably connecting said leg means to said puller jaw means.

3. The apparatus of claim 2 wherein the lip of the said first puller jaw means together with the said lip of the second puller jaw means form a shoulder which describes an arc of approximately 310° measured on the periphery of the said gear.

4. The apparatus of claim 1 further including a connecting swivel pad means at the leading end of the screw thrust means, the swivel pad means having the capability of rotating freely relative to the screw thrust means.

* * * * *

UNITED STATES PATENT AND TRADEMARK OFFICE

CERTIFICATE OF CORRECTION

PATENT NO. : 4,210,990

DATED : July 8, 1980

INVENTOR(S) : Raymond L. Krieger

It is certified that error appears in the above-identified patent and that said Letters Patent are hereby corrected as shown below:

Column 2, line 65:

Change the numeral "25" to --26--.

Signed and Sealed this

*Twenty-first* Day of *October 1980*

[SEAL]

*Attest:*

SIDNEY A. DIAMOND

*Attesting Officer* *Commissioner of Patents and Trademarks*